United States Patent
Cutforth et al.

(10) Patent No.: US 9,727,432 B1
(45) Date of Patent: Aug. 8, 2017

(54) ACCELERATED TESTING USING SIMULATED FAILURES IN A MULTI-DEVICE STORAGE SYSTEM

(71) Applicant: Seagate Technology LLC, Cupertino, CA (US)

(72) Inventors: Craig F. Cutforth, Louisville, CO (US); Ajaykumar Rajasekharan, Longmont, CO (US); Rajaram Singaravelu, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 232 days.

(21) Appl. No.: 14/510,860

(22) Filed: Oct. 9, 2014

(51) Int. Cl.
  *G06F 11/00* (2006.01)
  *G06F 11/263* (2006.01)

(52) U.S. Cl.
  CPC .................................. *G06F 11/263* (2013.01)

(58) Field of Classification Search
  CPC ... G06F 11/261; G06F 11/263; G06F 11/2635
  USPC .......................................................... 714/41
  See application file for complete search history.

(56) References Cited

U.S. PATENT DOCUMENTS

| | | | |
|---|---|---|---|
| 4,465,973 A | 8/1984 | Countryman, Jr. | |
| 5,513,339 A * | 4/1996 | Agrawal | G06F 11/261 703/15 |
| 7,467,333 B2 * | 12/2008 | Keeton | G06F 11/261 703/21 |
| 7,596,673 B2 | 9/2009 | Read | |
| 8,405,412 B2 | 3/2013 | Kohler et al. | |
| 8,433,849 B2 | 4/2013 | De Schrijver et al. | |
| 8,522,073 B2 | 8/2013 | Cohen | |
| 8,661,382 B2 * | 2/2014 | Lamb | G06F 17/5009 703/13 |
| 8,689,168 B1 * | 4/2014 | Baumann | G06F 17/5036 716/136 |
| 2009/0193296 A1 * | 7/2009 | Kellington | G01R 31/31816 714/33 |
| 2010/0115335 A1 * | 5/2010 | Wylie | G06F 11/10 714/25 |
| 2010/0146338 A1 * | 6/2010 | Schalick | G06F 11/3648 714/33 |

(Continued)

FOREIGN PATENT DOCUMENTS

EP       1025680 B1    1/2005

*Primary Examiner* — Elmira Mehrmanesh
(74) *Attorney, Agent, or Firm* — Hall Estill Attorneys at Law

(57) ABSTRACT

Apparatus and method for accelerated testing of a multi-device storage system. In some embodiments, the storage system includes a server adapted to communicate with a user device, and a plurality of data storage devices adapted to store and retrieve data objects from the user device. The server maintains a map structure that describes the data objects stored on the data storage devices. A fault injection module is adapted to induce simulated failures of selected data storage devices in relation to a time-varying failure rate distribution associated with the data storage devices that indicates an observed failure rate over a first time interval. The simulated failures are induced by the fault injection module over a second time interval shorter than the first time interval. The server operates to modify the map structure responsive to the simulated failures.

18 Claims, 6 Drawing Sheets

(56) References Cited

U.S. PATENT DOCUMENTS

| | | | |
|---|---|---|---|
| 2011/0055777 A1* | 3/2011 | Tremaine | G06F 11/263 716/106 |
| 2013/0096902 A1* | 4/2013 | Bose | G01B 31/318357 703/14 |
| 2013/0305199 A1* | 11/2013 | He | G06F 17/5054 716/104 |
| 2014/0025363 A1 | 1/2014 | Zou et al. | |
| 2014/0143617 A1* | 5/2014 | Griffin | G11C 16/349 714/718 |
| 2016/0110274 A1* | 4/2016 | Ito | G06F 11/26 714/41 |

\* cited by examiner

ACCELERATED TESTING USING SIMULATED FAILURES IN A MULTI-DEVICE STORAGE SYSTEM

SUMMARY

Various embodiments of the present disclosure are generally directed to an apparatus and method for accelerated testing of a multi-device storage system.

In some embodiments, a storage system includes a server adapted to communicate with a user device, and a plurality of data storage devices adapted to store and retrieve data objects from the user device. The server maintains a map structure that describes the data objects stored on the data storage devices. A fault injection module is adapted to induce simulated failures of selected data storage devices in relation to a time-varying failure rate distribution associated with the data storage devices that indicates an observed failure rate over a first time interval. The simulated failures are induced by the fault injection module over a second time interval shorter than the first time interval. The server operates to modify the map structure responsive to the simulated failures.

In other embodiments, a server is adapted to communicate with users over a network, the server having a processor and associated memory to maintain a map structure. A plurality of storage enclosures are coupled to the server. Each storage enclosure houses a plurality of data storage devices which store and retrieve data objects of the users, a control board, a power supply and a cooling assembly. The map structure of the server describes the data objects stored by the data storage devices. A plurality of storage controllers are provided, each storage controller having a processor and associated memory to control an associated storage enclosure. A fault injection module has a processor and associated programming in memory adapted to induce a total number of simulated failures of at least selected data storage devices of the plurality of storage enclosures over an accelerated time interval. The total number of simulated failures induced during the accelerated time interval is equal to or greater than a total number of predicted failures of the data storage devices expected during a longer, service life interval of the storage enclosures. The server modifies the map structure response to each of the total number of simulated failures.

In still other embodiments, a computer-implemented method involves using an storage system to store user data objects in a plurality of data storage devices in accordance with a map structure maintained by a server; predicting a total number of actual failures of the data storage devices over a service life interval thereof responsive to a time-varying failure rate distribution associated with the data storage devices; and inducing a total number of simulated failures corresponding to the total number of actual failures during an accelerated testing interval shorter than the service life interval. The server updates the map structure responsive to each of the total number of simulated failures.

DETAILED DESCRIPTION

Figure 1:
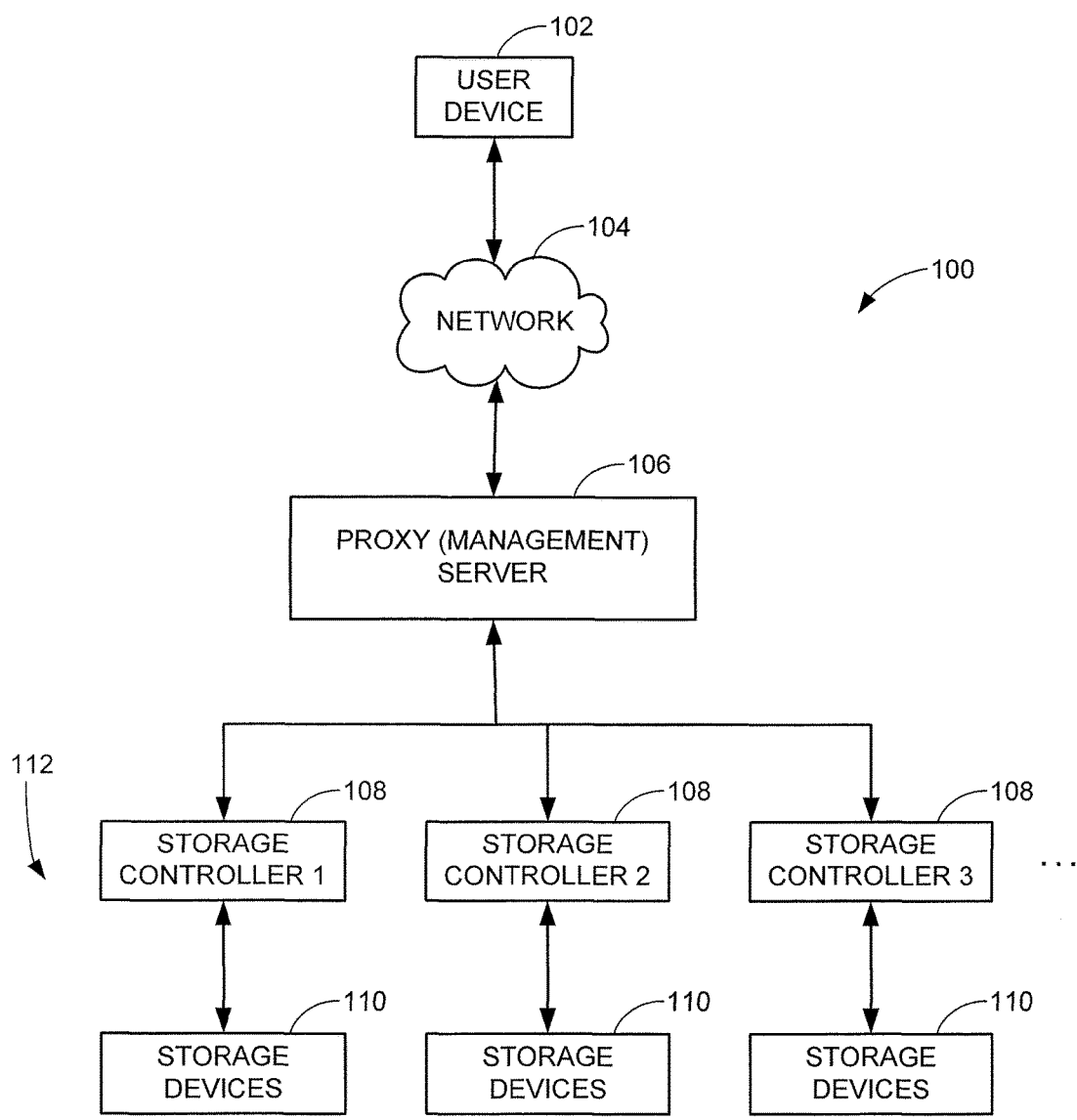
FIG. 1 is a functional representation of a multi-device storage system configured and operated in accordance with various embodiments of the present disclosure.

The present disclosure generally relates to data storage, and more particularly to accelerated testing of a multi-device storage system such as the type used for cloud computing environments Cloud computing generally refers to a network-based distributed data processing environment. Network services such as computational resources, software and/or data are made available to remote users via a wide area network, such as but not limited to the Internet. A cloud computing network can be a public "available-by-subscription" service accessible by substantially any user for a fee, or a private "in-house" service operated by or for the use of one or more dedicated users.

A cloud computing network is generally arranged as an object storage system whereby data objects (e.g., files) from users ("account holders" or simply "accounts") are replicated and stored in storage locations within the system. Depending on the system configuration, the storage locations may be distributed across a large geographical area. The network may be accessed through web-based tools such as web browsers, and provides services to a user as if such services were installed locally on the user's local computer.

Object storage systems are often configured to be massively scalable so that new storage nodes, servers, software modules, etc. can be added to the system to expand overall capabilities in a manner transparent to the user. An object storage system can continuously carry out significant amounts of background overhead processing to store, replicate, migrate and rebalance the data objects stored within the system in an effort to ensure the data objects are available to the users at all times.

Because of the relative complexity of an object storage system, it can be difficult to assess the reliability performance of the system over time. Such systems are often designed with a view toward expecting component failures at a variety of operational levels and providing sophisticated repair and replacement schemes to maintain system availability. It can therefore be challenging to accurately assess real-world reliability and system availability performance, particularly in view of different system configurations and operational environments.

Accordingly, various embodiments of the present disclosure are generally directed to an apparatus and method for assessing the reliability performance of a multi-device storage system. As explained below, a control module in the form of a fault injection system operates during an accelerated testing mode to accelerate an operational service life for the object storage system. The fault injection system generally operates to inject simulated failures of various system components and combinations thereof. The simulated failures can be carried out automatically through software or other automated mechanisms, or can require user intervention.

The component failures are simulated in relation to time-varying failure rate distributions associated with the various components that correlate to observed failure rates over a first (normal) time interval. The failures are simulated by the fault injection system over a second (accelerated) time interval significantly shorter than the first time interval.

In this way, a variety of different operational conditions can be simulated and analyzed based on real-world reliability performance metrics in a relatively short period of time. Hardware and software conflicts, issues and difficulties can be identified and, as necessary, resolved through system reconfiguration operations. A newly designed system can be subjected to a form of certification testing prior to installation in a customer environment to provide a selected level of confidence that the system is sufficiently robust to achieve the requisite reliability and availability levels specified for the system.

These and other features of various embodiments of the present disclosure can be understood beginning with a review of FIG. 1 which shows a multi-device storage system 100. It is contemplated that the system 100 is operated as a subscription-based or private cloud computing network for object storage, although such is merely exemplary and not necessarily limiting.

The system 100 is accessed by one or more user devices 102, which may take the form of a network accessible device such as a desktop computer, a terminal, a laptop, a tablet, a smartphone, a game console or other device with network connectivity capabilities. In some cases, each user device 102 accesses the system 100 via a web-based application on the user device that communicates with the system 100 over a network 104. The network 104 may take the form of the Internet or some other computer-based network.

The system 100 includes various elements that may be geographically distributed over a specified service area. These elements include one or more proxy (management) servers 106 which process communications with the user devices 102 and perform other system functions. A plurality of storage controllers (servers) 108 control local groups of storage devices 110 used to store data objects from the user devices 102 as requested, and to return the data objects as requested. Each local grouping of storage devices 110 and associated controller(s) 108 is characterized as a storage node 112.

While only three storage nodes 112 are illustrated in FIG. 1, it will be appreciated that any number of storage nodes can be provided in, and/or added to, the system. It is contemplated that each storage node constitutes one or more zones. Each zone is a physically separated storage location configured to be isolated from other zones to the degree that a service interruption event, such as a loss of power, that affects one zone will not likely affect another zone. A zone can take any respective size such as an individual storage device, a group of storage devices, a server cabinet of devices, a group of server cabinets or an entire data center. The system 100 is scalable so that additional controllers and/or storage devices can be added to expand existing zones or add new zones (or other locations) to the system.

Any number of hierarchies can be used, such as from smallest to largest (e.g. device, node, zone, region, etc.).

Generally, data presented to the system 100 by the users of the system are organized as data objects, each constituting a cohesive associated data set (e.g., a file) having an object identifier (e.g., a "name"). Examples include databases, word processing and other application files, graphics, AN works, web pages, games, executable programs, etc. Substantially any type of data object can be stored depending on the parametric configuration of the system.

Each data object presented to the system 100 will be subjected to a system replication policy so that multiple copies of the data object are stored in different zones. It is contemplated albeit not required that the system nominally generates and stores three copies (replicas) of each data object. This enhances data reliability and availability at the cost of increased background overhead processing to maintain the system in an updated state.

Figure 2:
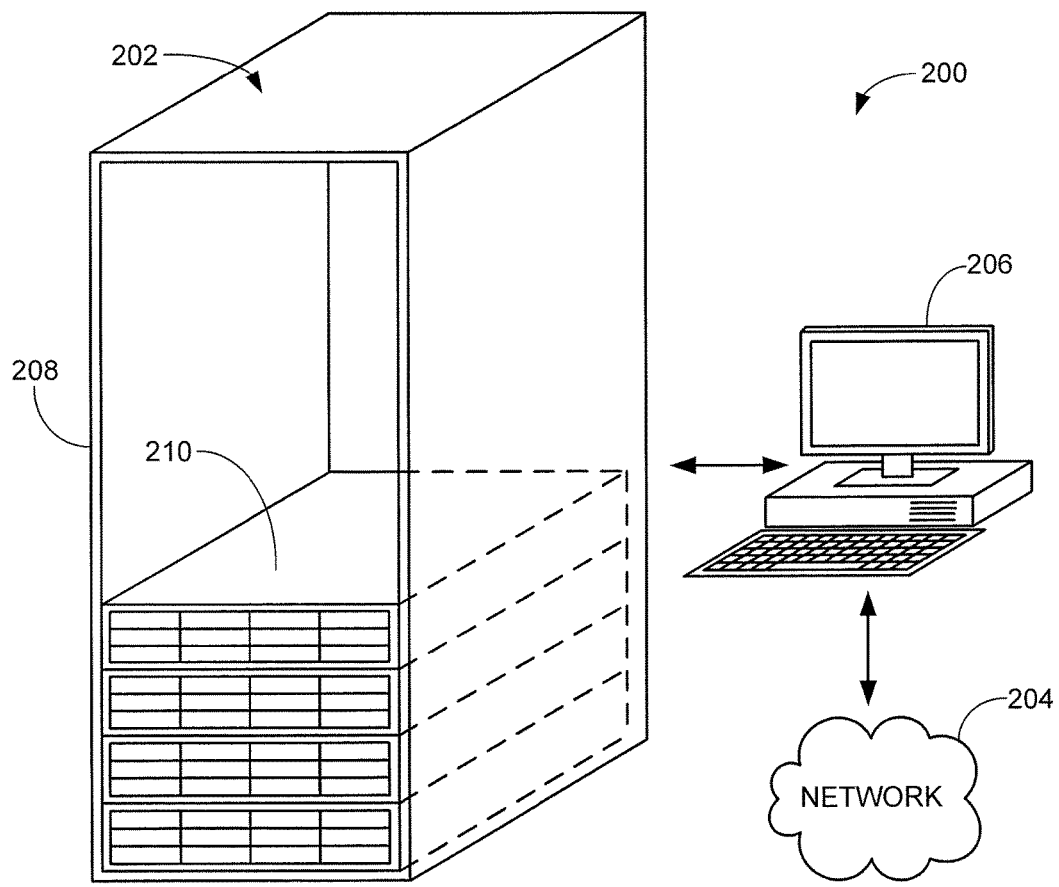
FIG. 2 shows a storage cabinet of the storage system of FIG. 1 in accordance with some embodiments.

An example hardware architecture for portions of the system 100 is represented in FIG. 2. Other hardware architectures can be used. A storage node 200 includes a storage assembly 202 coupled to a network 204. An optional computer workstation 206 may provide user access to selected functionality as desired.

The storage assembly 202 includes one or more server cabinets (racks) 208 with a plurality of modular storage enclosures 210. In some cases, multiple zones may be defined in a single rack. In other cases, a single zone may be made up of multiple adjacent racks loaded with storage enclosures and other components.

The storage rack 208 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 210 has a height that is a multiple of the storage units, such as 2 U (3.5 in.), 3 U (5.25 in.), 4 U (7 in.), etc.

In some cases, functionality of the storage controller 108 (FIG. 1) can be implemented using the local computer 206. In other cases, the storage controller functionality can be implemented by a rack mounted unit installed in the cabinet 208. Other functions can be incorporated as well such as switching modules, tape backup storage systems, etc. The local computer 206 provides access to certain accelerated testing functions described below.

The storage node 200 may be operated in a specially configured environment such as a computer room with special temperature and humidity controls, weight bearing and anti-vibration flooring supports, uninterrupted/filtered power supplies, etc. In some cases, external cooling is supplied to the room to address what can be a significant heat load from the storage enclosures 210. In many applications, the front of each cabinet 208 is aligned along a so-called "cold aisle" and the back of each cabinet is aligned along a "warm aisle," so that cooling air from the room is drawn through the storage enclosures 210 from the cold aisle to the warm aisle.

Figure 3:
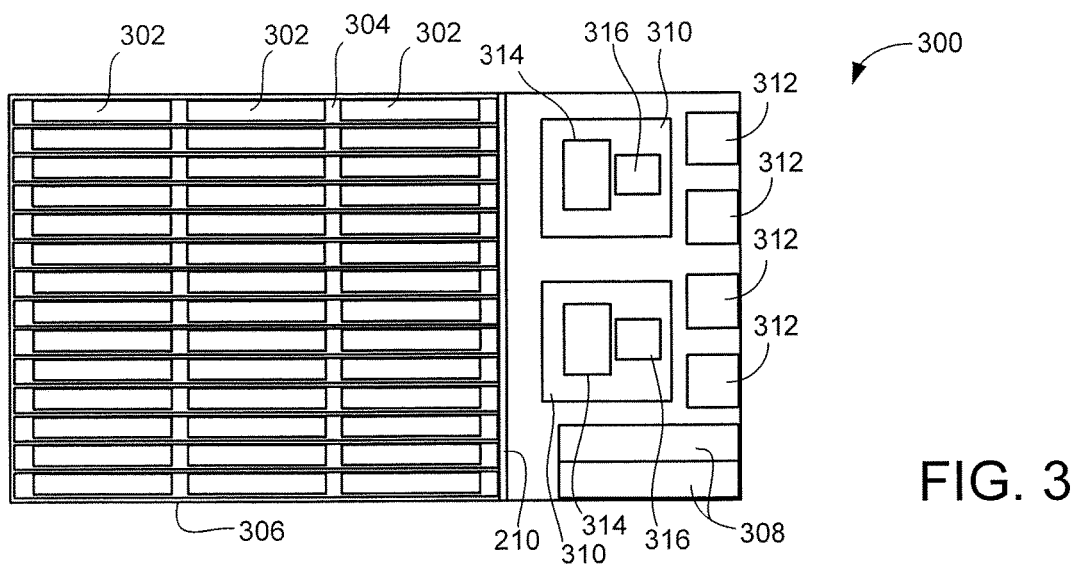
FIG. 3 is an exemplary storage enclosure of the system of FIG. 2.

FIG. 3 shows an exemplary storage enclosure 300 suitable for use in the cabinet 208 of FIG. 2. The storage enclosure is a 3 U multi-device data storage enclosure with 42 (14×3) storage devices 302 arranged into retractable sleds (trays) 304 in a rigid housing 306. Other numbers and orientations of storage devices can be provided in each storage enclosure. It will be noted, for example, that the storage devices in the storage enclosure 300 of FIG. 3 are aligned vertically (on edge), while the storage devices in the storage enclosures 210 of FIG. 2 are aligned horizontally (flat). The storage devices 302 can take a variety of forms, such as hard disc drives (HDDs), solid-state drives (SSDs), hybrid HDDs, tape drives, optical drives, etc.

Regardless of form, each of the storage devices 302 includes storage media (e.g., solid-state memory, rotatable discs, etc.) to provide main memory storage capacity. Individual data storage capacities may be on the order of about 4 terabytes, TB ($4 \times 10^{12}$ bytes), per device, or some other value. Devices of different capacities, and/or different types, can be used in the same node and/or the same enclosure. Each storage node 200 (FIG. 2) can thus provide the system 100 (FIG. 1) with several petabytes, PB ($10^{15}$ bytes) of available storage or more, and the overall storage capability of the system 100 can be several exabytes, EB ($10^{18}$ bytes) or more.

In the context of an HDD, the storage media may take the form of one or more axially aligned magnetic recording discs which are rotated at high speed by a spindle motor. Data transducers can be arranged to be controllably moved and supported adjacent recording surfaces of the storage disc(s). While not limiting, in some embodiments the storage devices 302 are 3½ inch form factor HDDs with nominal dimensions of 5.75 in×4 in×1 in, or 2½ inch form factor HDDs with nominal dimensions of 4 in×2.88 in by 1 in.

In the context of an SSD, the storage media may take the form of one or more flash memory arrays made up of non-volatile flash memory cells. Read/write/erase circuitry can be incorporated into the storage media module to effect data recording, read back and erasure operations. Other forms of solid state memory can be used in the storage media including magnetic random access memory (MRAM), resistive random access memory (RRAM), spin torque transfer random access memory (STRAM), phase change memory (PCM), in-place field programmable gate arrays (FPGAs), electrically erasable electrically programmable read only memories (EEPROMs), etc.

In the context of a hybrid drive, the storage media may take multiple forms such as one or more rotatable recording discs and one or more modules of solid state non-volatile memory (e.g., flash memory, etc.). Other configurations for the storage devices 302 are readily contemplated, including other forms of processing devices besides devices primarily characterized as data storage devices, such as computational devices, circuit cards, etc. that at least include computer memory to accept data objects or other system data.

The storage enclosures 300 include various additional active components such as power supplies 308, control boards 310, and cooling assemblies including electrical fans 312. The control boards 310 may include one or more programmable processors 314 and/or application specific integrated circuits (ASICs) 316 to carry out various data transfer control functions for the storage devices 302. A midplane 318 provides electrical and mechanical interconnections between the storage devices 302 and the control boards 310. Various additional elements such as electrical cables, switches, indicator lights, air flow diverters, boot devices, etc. can be incorporated into the storage enclosure 300 but have been omitted for clarity of illustration.

Figure 4:
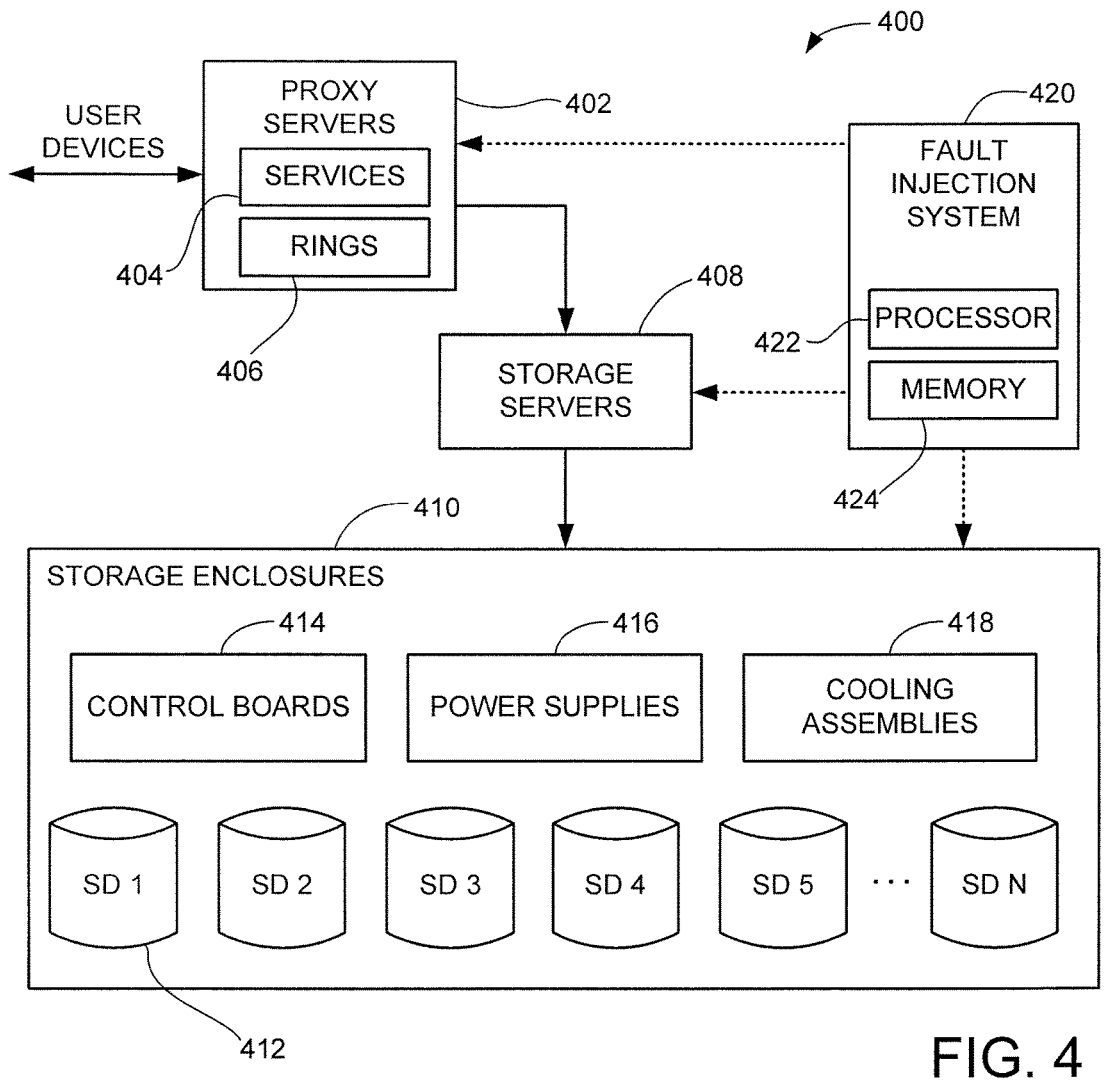
FIG. 4 is a functional representation of the system of FIG. 1 in conjunction with a fault injection system constructed and operated in accordance with some embodiments of the present disclosure.

A variety of software architectures can be implemented by an object storage system such as 100 in FIG. 1. As generally represented in FIG. 4, another distributed object storage system 400 is utilized in some embodiments in which a number of proxy servers 402 operate to handle overall communications with users of the system. The proxy servers access a plurality of services 404 and rings 406 (map structures) to control data flow to the respective data storage devices of the system.

The services 404 can include user account services, container services, replicators, updaters, auditors and ring management modules. The rings 406 can include an account ring, a container ring and an object ring. Other forms of rings can be incorporated into the system as desired. Generally, each ring is a data structure that maps different types of entities to locations of physical storage. Each ring generally takes the same overall format, but incorporates different hierarchies of data. The rings may be stored in computer memory and accessed by an associated processor during operation.

Objects presented for storage are routed by the proxy servers 402 to appropriate storage servers 408 which in turn direct the storage of the replicated sets of data to various storage enclosures 410. The exemplary storage enclosure 410 in FIG. 4 includes a plural number N storage devices 412 (SD 1 to SD N), control boards 414, power supplies 416 and cooling assemblies 418. Other elements may be included as well.

FIG. 4 further illustrates a fault injection system 420 operable in accordance with various embodiments during accelerated testing of the system 400. The fault injection system 420 induces simulated faults ("failures") at various levels within the system 400 including at the proxy server level, the storage server level and the storage enclosure level. Other failures can be induced as well, such as failures relating to input power, environmental conditions (e.g., higher ambient temperature, vibration, etc.). The fault injection system (module) 420 includes a programmable processor 422 and associated programming stored in memory 424 to carry out the various functions described below.

The simulated failures can involve both hardware and software based faults and are configured to generally mimic real-world reliability performance albeit at an accelerated rate. It is contemplated that the accelerated testing is performed under closely controlled conditions, such as during new product development and qualification efforts, to predict and assess real-world reliability performance of the system.

Figure 5:
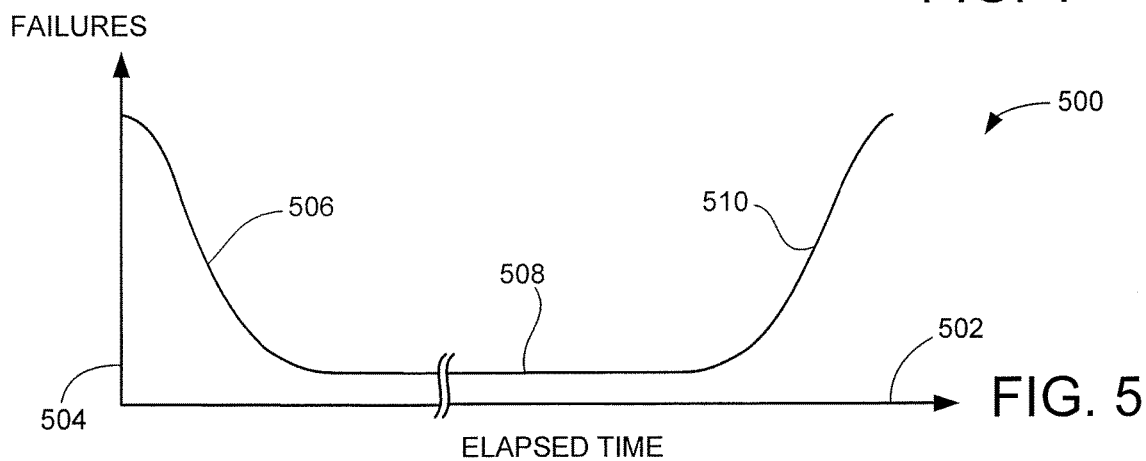
FIG. 5 is a reliability bathtub curve illustrative of reliability performance of various components of FIG. 4.

To this end, FIG. 5 provides a generalized reliability curve 500 plotted against an elapsed time x-axis 502 and a population of failures y-axis 504. The reliability curve 500 takes a well-known "bathtub" shape indicative of different types of failures experienced by components such as those depicted in FIG. 4. The curve 500 includes an early life portion 506, an intermediate service life portion 508 and an end of life portion 510. It will be appreciated that the curve 500 is generalized in nature and can take a variety of forms based on the characteristics of different components. Nevertheless, curves such as 500 are well known, and it has been demonstrated that many different types of electrical, mechanical and software based components tend to follow such curves.

The early life portion 506 relates to initial failures due to manufacturing or other related types of defects. Generally, manufacturing testing (e.g., burn-in) is often designed in an effort to identify and remove such failures. Field use of the system is represented by portion 508. Portion 508 is the largest portion of the curve 500 and may normally extend over several years of service life. Portion 510 represents end of life conditions as components begin to exhibit wear failures and other aging related issues. Portions 506 and 510 tend to be non-linear, while portion 508 tends to be linear.

During normal field use (portion 508), components within a system will tend to fail randomly, but at an overall rate that is substantially constant over time. This portion of the service life of a component is often provided with a reliability measure in terms of mean time between failures (MTBF). MTBF, generally defined as the predicted elapsed time between inherent failures of a system during operation, constitutes the mean (average) time between failures of the system. MTBF is often represented as $\lambda$ and may be expressed in terms of failures per thousand hours, per million hours (parts per million or ppm), etc.

While MTBF can be characterized in a variety of ways depending on the requirements of a given application, generally MTBF failures are usually counted for unscheduled events that result in a repair/replacement/reset operation to restore the unit to proper operation. Scheduled maintenance actions that result in system unavailability are not normally included in a failure for purposes of MTBF calculations.

MTBF and other reliability measurements are often used as part of a service strategy for systems such as 400. While it can be relatively difficult to predict when a particular component will fail, such as the storage device SD 2 in FIG. 4, given a large enough population it is relatively easy to accurately predict that some number of the storage devices will fail and require replacement over a given period of time (e.g., a subset M of the N storage devices will likely fail in the next 12 months, etc.).

Figure 6:
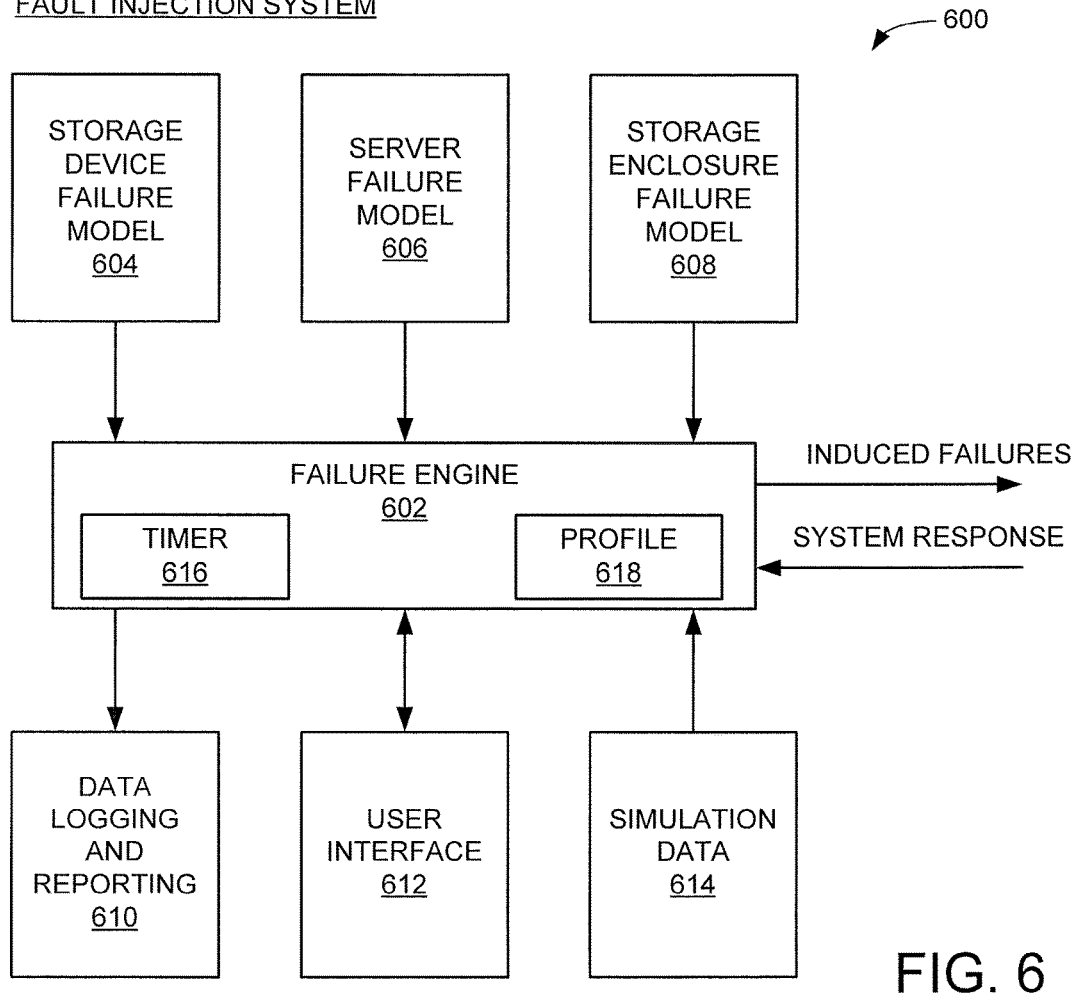
FIG. 6 is a functional representation of the fault injection system of FIG. 4 in accordance with some embodiments.

An embodiment of the fault injection system 420 of FIG. 4 is shown at 600 in FIG. 6. The system 600 uses empirically derived and/or calculated reliability data such as set forth in FIG. 5 to model the expected failures for the various components of the system 400 over a specified service life. The system includes various modules including a failure engine 602, various component model blocks 604, 606 and 608, a data logging and reporting module 610, a user interface module 612 and simulation data 614. Each of these modules will be discussed below.

At this point it will be helpful to give a concrete example to explain the operation of the fault injection system 600. Let X represent the total number of expected storage device failures that the system 400 of FIG. 4 would be expected to have over a service interval of 36 months (or some other service life duration). Stated another way, the number X is the total number of storage devices 412 that would be predicted to fail, and require replacement, over the corresponding service interval. The number X is based on the service interval, total number of storage devices in the system, and the predicted MTBF for portion 508 in FIG. 5. As desired, failures based on early life (portion 506) and end of life (portion 510) can be included to provide a failure profile that varies over time. Storage device manufacturers tend to maintain accurate estimates of such data based on real world performance metrics.

During system evaluation, a number equal to, or substantially corresponding to, X total number of storage device failures are induced by the fault injection system 600 over a significantly shorter period of time, such as 36 days (or some other accelerated duration). Such failures are similarly induced for each of the major service elements of the system 400 (e.g., servers, control boards, power supplies, cooling assemblies, etc.). In this way, substantially the same number and types of failures that the system would be nominally expected to see during its entire service life are experienced in a relatively short period of time. Any number of ratios can be used for the respective normal (first) time interval and the accelerated (second) time interval, including 10:1, 20:1, 30:1, 50:1, 100:1 or more.

The failures may be implemented using hardware, software and/or test personnel intervention. A given component may be simulated as failed simply by instructing test personnel to temporarily unplug a power or communication cable from the component. Test personnel may operate to shut down, physically remove and replace a particular component (e.g., storage device 412, control board 414, etc.) with a new component. In other cases, specially configured test programming code can be used (such as, for example, in computer 206, FIG. 2) to "virtually" remove certain components or resources from the system.

At this point it will be appreciated that some types of system failures will tend to be more catastrophic than others. A failed fan assembly may allow a given storage enclosure 410 to continue to operate, albeit with a slightly higher temperature for the components housed within the storage enclosure. Unless the failed fan assembly causes one or more active components to shut down thereby inducing a cascaded data migration/ring rebalancing operation, the effect of a failed fan assembly upon system performance may be relatively minor. Nevertheless, these and other types of minor failures can still be induced to adjudge system performance.

Similarly, should the system under evaluation incorporate multiple available proxy servers (e.g., 402 in FIG. 4), taking one or more of the proxy servers offline to simulate a server failure may result in lower overall I/O performance of the system as the remaining proxy servers step up to handle the increased workload. Again, however, the loss of a proxy server may not have a significant cascading effect throughout the rest of the system since the system is still able to generally use the existing data structures to service the various user data transfer requests.

Simulated loss of one or more storage nodes, such as representative of the temporary loss of an entire data center due to a natural catastrophe (storm, etc.) is another example of a failure that may not have an immediate stress impact upon the system. It is presumed that during the outage, data requests can be serviced from one or more of the remaining replicated copies of the various objects in other nodes. Bringing the failed storage node back on line will involve some amount of stress on the system to bring the out of service storage node back up to current levels, but such background processing is carried out routinely in a distributed object storage system.

By contrast, failures at the storage enclosure level, and particularly at the storage device level, can have an immediate and significant impact upon an existing system. The loss of an existing storage device, for example, and the replacement thereof with a new storage device, can require immediate reconstruction of the data from the failed storage device and placement of the replacement data on the replacement device or elsewhere in the system. While object storage systems such as 400 are designed to expect and recover from the regular failure of storage devices on a routine basis, subjecting the system to numerous successive storage device failures can tend to provide a heavy workout for the system hardware and firmware in rebalancing the rings and maintaining the mapping and allocation data at a current level, particularly during times of high system loading.

Accordingly, the fault injection system 600 is configured to design an injected fault sequence involving these and other types of failures. Administrative personnel can operate to increase the number of expected failures of various components above what normal reliability curves would predict (e.g., inducing a number greater than X in the example given above), as well as select different combinations to evaluate system response and demonstrate system capabilities.

The respective model blocks 604, 606 and 608 shown in FIG. 6 provide failure modeling data to the failure engine 602 for the respective types of components (e.g., storage devices, servers, control boards, power supplies, cooling assemblies, etc.). In response, the failure engine 602 generates a failure profile, or script, to signify various simulated failures that are to occur during the accelerated testing.

The failure engine 602 thereafter outputs a sequence of induced failures at different times during the accelerated testing operation in accordance with the failure profile. As noted above, the induced failures may involve instructions to test personnel to take various physical actions such as unplugging power or communication cables, to turn off or reset various systems. In other cases, the failures may be enacted through software commands to the various system components. In still other cases, failures may include attempted security breaches or other attempts to corrupt existing processes in accordance with the types of attacks or conflicts that may be expected to arise during normal operation.

In one embodiment, the failure engine 602 instructs a selected storage server 408 (FIG. 4) to electronically turn off (e.g., unload, de-partition, etc.) one or more selected storage devices 412, and allow the system to attempt to recover. In some cases, the storage device subjected to simulated failure may simply be given a new replacement identifier (ID) name without the need to physically remove and replace the device.

The data logging and reporting module 610 may include various sensors, data collection routines and other mechanisms to measure and report system performance in response to the induced failures. Any number of parameters can be captured including throughput parameters (e.g., I/O rates, loading and balance levels, latency, etc.), environmental parameters (temperature, vibration, etc.), data parameters (e.g., bit error rates, misdirected writes, etc.), etc.

The user interface block 612 provides an interface for the test personnel executing the accelerated testing operation. In some cases, instructions for manual intervention may be communicated to the test personnel via the user interface, such as an instruction to physically manipulate a particular component (unplug a power supply, reset a server, etc.). In other cases, the user interface may allow a menu of particular failure modes to be input by the test personnel. For example, because of existing performance, test personnel may desire to enact a particular failure mode that is not part of the existing script developed or uploaded by the failure engine 602. Notifying the failure engine of such "override failures" enable the system to log the event and track the results.

The simulation data block 614 provides one or more scripts of data I/O activity that the system processes during the accelerated testing phase. Benchmark type tests can be supplied so that write-heavy and read-heavy operational loading is supplied to the system. As desired, systems that see different loading levels at different times of the day/week/month can be provided with similarly time-varying loading levels. However, because of the accelerated nature of the failure rate of the system, it is contemplated that the simulation data will tend to provide relatively high levels of I/O demands upon the system during the entire acceleration testing period.

FIG. 6 further shows the failure engine 602 to incorporate a timer block 616 to provide requisite timing inputs to the engine, and a profile block 618 to schedule the various induced failures. The failure engine 602 can take a variety of forms, including a programmable processor with associated programming in memory to carry out the requisite failure execution sequence.

Figure 7:
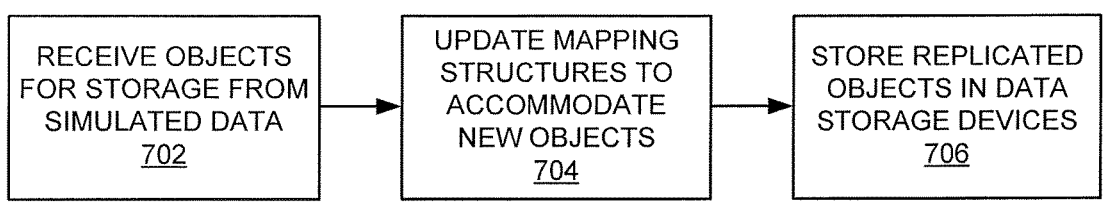
FIG. 7 is a process flow diagram showing a non-failure data flow in the system of FIG. 4.

FIG. 7 provides additional details with regard to the manner in which a non-failure data flow 700 takes place through the system 400 during accelerated testing. FIG. 7 is merely exemplary and will depend upon system architecture and other factors. As part of a put (write) command, the system receives objects for storage from the simulation data block 614 in FIG. 6, as denoted by block 702 in FIG. 7. The data may belong to a particular user account and be assigned to a particular container, and so the various rings will be accessed and updated to reflect the new objects, block 704. Other operations may take place during the processing of block 704 such as the formation of additional replicated objects, the identification of storage nodes to which the objects will be stored, etc.

The replicated objects are thereafter transferred to the respective storage nodes at block 706 to store the objects in one or more individual storage devices 612 (FIG. 6). In some cases, additional processing such as storage node level RAID (redundant array of independent discs) techniques may be applied to the data so that the input data are incorporated into a local RAID array formed within or among the various storage enclosures 610. Depending on the storage technique, one or more parity devices may be used to ensure recovery of the data during subsequent get (read) operations.

Figure 8:
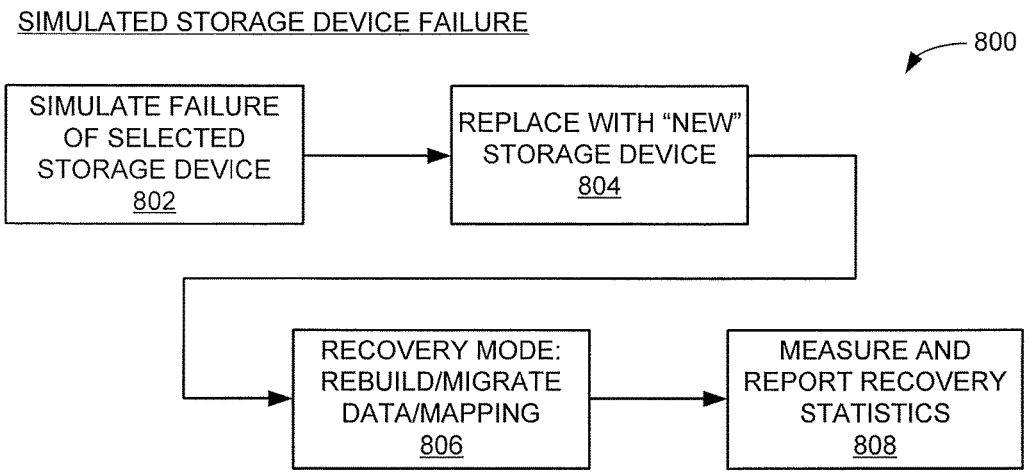
FIG. 8 is a simulated storage device failure flow for the system of FIG. 4.

FIG. 8 is a process flow 800 for simulated storage device failures. As noted above, during the course of the testing an example protocol may involve simulating the same total number of storage device failures as would be expected during a normal service life of the system (e.g., 36 months, etc.). The storage devices may be selected randomly or in accordance with a predefined schedule so that selected devices are "failed" from each storage enclosure, from each position in a storage enclosure, etc.

In some cases, a notification is supplied to the test personnel to physically retract the associated sled (e.g., 304, FIG. 3) and physically remove a selected storage device 302 and replace the removed device with a new device. In other cases, the storage server (e.g., 408, FIG. 4) may be instructed to decommission one or more storage devices 412 from one or more storage enclosures 410 while retaining the storage device in place.

Regardless, once the "new" replacement storage device is in place, block 804, the system recognizes the new device and proceeds to repopulate the device with data during a recovery mode, block 806. Such recovery may include using parity drives to reconstruct existing data. Various system level map structures (rings) may be updated and balanced at this time.

Depending on the size and duration of the outage, significant data migrations and remapping operations may take place as a result of the storage device failure. The system monitors various recovery statistics at block 808 to assess the extent to which the failure and replacement sequence involved system resources. Other parameters, such as the total number of actions taken, the time required to return the system to a steady-state level, etc. can also be accumulated.

Figure 9:
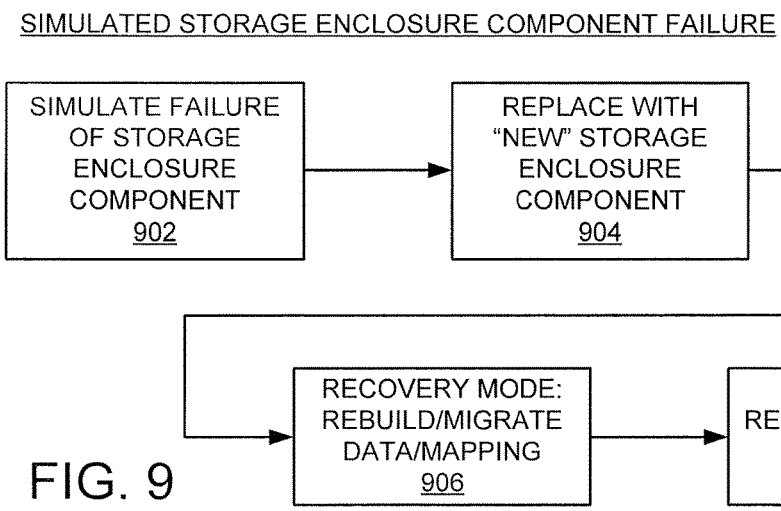
FIG. 9 is a simulated storage enclosure component failure flow for the system of FIG. 4.

FIG. 9 provides a process flow 900 for simulated storage enclosure component failures. While it is expected that the process flow 900 will be similar to that discussed above in FIG. 8, a separate flow is supplied since other types of system responses may arise. As before, a simulated failure of one or more storage enclosure components, or an entire storage enclosure, is carried out at block 902. Example components discussed above can include control boards, power supplies, fans, boot devices, etc. In some cases, the failures may be induced via software such as by commands to deactivate certain components such as a selected control board. In other cases, the failures may be induced manually by the test personnel unplugging and/or removing various elements.

It is contemplated in some cases that failover redundant control systems will be enacted so that, for example, a given storage enclosure can continue to operate as normal with the loss of a single control board, since the second control board is provided with the requisite functionality to assume control of the entire storage enclosure workload. It will be appreciated that leaving a storage enclosure in this condition may have other effects long term, such as increased heat generation, lower throughput performance, etc., so simulating such failures can be useful particularly for a relatively extended period of time. Similarly, redundant power supplies are often sized such that, at least for short periods of time, a single power supply can continue to supply the required power for the entire enclosure.

In further cases, some storage enclosures may be provided with intelligent cooling applications so that, for example, loss of a fan assembly results in remaining fans increasing speed or duty cycle. These and other recovery operations can be evaluated for efficacy.

As before, the "failed" component is replaced at block 904, a recovery mode (if necessary) is enacted at step 906 and recovery statistics are accumulated at step 908. The flow 900 of FIG. 9 can be used at a subsystem level as well: for example, an entire rack of storage enclosures and servers can be powered down to see how the system manages with the loss of system capability, and how the system recovers once the deactivated subsystem is brought back online.

Figure 10:
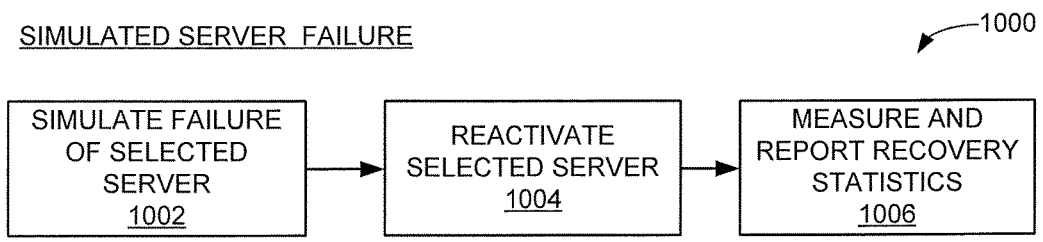
FIG. 10 is a simulated server failure flow for the system of FIG. 4.

FIG. 10 shows yet another exemplary process flow 1000 for simulated server failures. Such servers can include the proxy servers (e.g., 402, FIG. 4) and the storage servers 404. Failures are induced at block 1002, which may include power down/reset operations, corruption of data structures (e.g., substitution of corrupted ring data, etc.), simulated memory failure, simulated processing failure, declared overtemperature conditions, etc. It is contemplated that each of the servers will include one or more hardware-based or programmable processors with associated programming in local memory to carry out the requisite server functionality. Any number of suitable error conditions and failure modes can be simulated or induced as required.

The amount of recovery time and action required to recover from a server failure will depend on the requirements of a given failure mode. For example, shutting off all of the available proxy servers will basically tend to bring the entire system to a halt, since no new data exchanges can be carried out with the user devices. Turning off all but one proxy server, however, will significantly increase the demands upon that server. Similarly, turning off all of the storage servers will tend to shut down the system, but turning off all but one (or some) of the storage servers can significantly increase demand. Accordingly, the failed server is reactivated at block 1004 and recovery statistics are accumulated and reported at block 1006.

Figure 11:
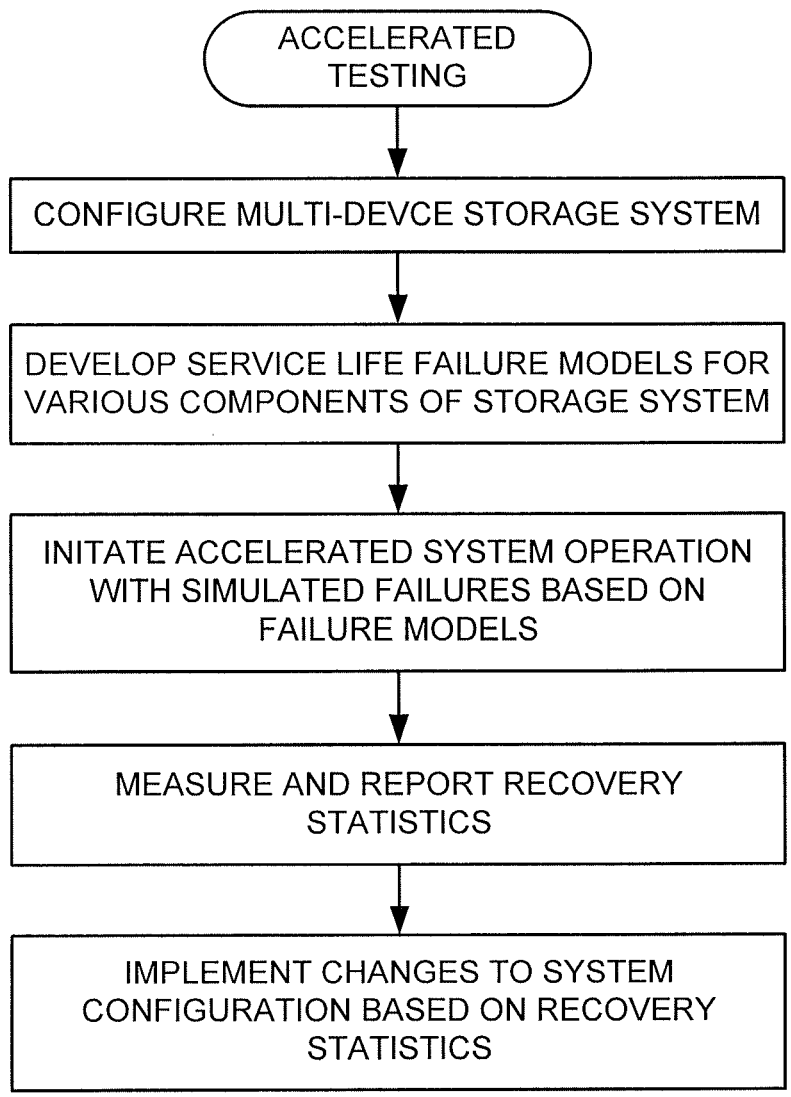
FIG. 11 is a flow chart for an accelerated testing routine illustrative of steps carried out in accordance with some embodiments of the present disclosure.

FIG. 11 provides a flow chart for an accelerated testing routine 1100 to summarize the foregoing discussion. It is contemplated that the routine 1100 will be carried out on an object storage system, such as the system 400 in FIG. 4, during an accelerated testing process to evaluate system reliability. The various steps shown in FIG. 11 are exemplary and can be modified, omitted, carried out in a different order, appended, etc.

The storage system is initially configured at step 1102. This may include attaching a fault injection system such as 420, 600 to the system. While any number of different configurations of systems can be evaluated, it is contemplated in some embodiments that multiple racks of storage enclosures arranged into multiple different storage nodes will be used to enable maximum stress upon the rebuild/rebalance aspects of the system. Separate power inputs may be provided to enable selective deactivation of the various components in the system.

As part of the preparation for the accelerated testing, service life failure models are developed for the various components in the storage system, step 1104. This will enable the fault injection system to develop various failure profiles that describe the sequence and timing of various simulated failures that are to be applied to the storage system.

Testing commences at step 1106 and simulated failures are periodically induced as described above in accordance with the failure models derived in step 1104. As discussed above, it is contemplated that the total numbers of failures will correspond to the expected total numbers of failures during the system service life. However, in some cases, less than all of the failures expected during the normal service life of the system are induced, and in other cases, more than all of the failures expected during the normal service life of the system are induced.

Recovery statistics are measured and reported at step 1108, and as necessary, changes to system configurations are implemented at step 1110 based on the measured recovery statistics.

In one example, system designers may believe that a first class of storage devices is necessary for a given operational environment. Such storage devices may have various characteristics believed to be necessary to enable the system to operate as specified. The characteristics can take a variety of forms including buffer sizes, processor speeds, interfaces, storage capacities, rotational speeds, reliability measurements, etc. The testing may demonstrate that another, lower performance storage device is suitable for use in the system, enabling significant cost savings since often, the cost of the storage devices can represent a significant portion of the total capital outlay for a system. In other cases, the testing may demonstrate that at least some, or all, of the storage devices need to be upgraded in order to achieve the requisite performance. Other system characteristics can be evaluated as well.

Accordingly, the various embodiments presented herein provide a number of benefits. In some embodiments, substantially the same number of failures that would be experienced over the specified service life of the system (e.g., 36 months, etc.) are experienced in a significantly shortened test time (e.g., 20 days, etc.). In other embodiments, a derated number of failures are induced in the system and correlated to real life expected performance. More failures can be induced at the beginning and end of the test to follow the specified reliability data characteristics are mirrored by the testing.

Network performance can be monitored to assess the background processing required to rebalance the rings as each set of components are failed and replaced by the system. The failure engine 602 can use appropriate algorithms to ensure that a number of different failure combinations are experienced.

It is expected that the storage devices will operate largely independently of each other; if a single storage device fails, it will not tend to impact an adjacent device. However, this may not always be the case, either from over-temperature conditions of a locally "hot" drive, rotational vibration levels induced by a drive having failed bearings, etc. Accordingly, in some embodiments such multiple drive failures can be modeled and implemented to observe how the system responds.

In some cases, the testing may serve as verification testing to simulate real-world system response. Maximum stress (e.g., close to 100% utilization) can be applied to the system in an effort to identify weak points that require redesign and improvement. Elevated temperature and other environmental conditions can be implemented (e.g., running the system in a temperature chamber) but such is not necessarily required since most data centers will operate in a controlled environmental environment. This is not a traditional "burn in" type test, but rather, an effort to experimentally observe system recovery efforts in relation to real world reliability data. In one sense, the testing allows the designers to conform that the system has been operated through X months of failures and has responded in a satisfactory way.

System changes can be incorporated into the design as a result of the accelerated testing. The storage devices used in a particular environment may need to be upgraded to a higher observed level of reliability (e.g., better, more expensive devices) or can be downgraded to a lower observed level of reliability. Other changes can be made as well including improvements to the routines used during rebalancing, etc.

From an analysis standpoint, in a low-load real world system where relatively few changes are being made to the data at a particular point in time, it might be possible to simply "replace" the failed drive and repopulate it with the data partitions that were stored thereon. This is particularly true if the drives were not accessed in the period of time during which the device was offline. Assuming that it takes, say, 15 minutes for a normal drive swap operation, then recovery from such a failure would potentially have little or no impact on the system. All that would normally be required would be to reload the data.

Accordingly, in still further embodiments the system may be configured such that, at least for some (if not all) of the failures, to ensure that a data put (write) operation is inserted into the system for each failed drive so that the system is taxed and has to do more than just reload the previously stored data. Additionally or alternatively, different delays may be incorporated into the time during which the "simulated failed" devices are offline, from a relatively short period such as 15 minutes to a much longer period such as a day or more. Finally, another evaluation result can include an ability to determine the total number of replicated objects for certain types of data, or based on storage locations within the system. For example, the system might be operated with three replicas, four replicas, etc. to evaluate how the system failures impact the system.

It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a storage system comprising a server adapted to communicate with a user device and a plurality of data storage devices adapted to store and retrieve data objects from the user device, the server maintaining a map structure that describes the data objects stored on the data storage devices; and
a fault injection module adapted to induce simulated hardware and software based failures of selected data storage devices in relation to a time-varying failure rate distribution associated with the data storage devices that indicates an observed failure rate over a first time interval, the simulated hardware and software based failures induced by the fault injection module over a second time interval shorter than the first time interval, first time interval corresponding to a specified operational service life of the storage system, a ratio between the first time interval and the second time interval being at least 20:1, the server modifying the map structure responsive to the simulated hardware and software based failures.

2. The apparatus of claim 1, the fault injection module inducing a failure in a selected data storage device by operably disconnecting the selected storage device from the server, instructing the selected data storage devices to erase the data objects stored thereon, and subsequently operably reconnecting the erased selected data storage devices to the server while the selected storage device remain housed within an associated storage enclosure.

3. The apparatus of claim 1, the fault injection module inducing a failure in a selected data storage device by outputting to a user interface an identification of the selected data storage device to enable a user to physically remove the selected data storage device from the storage system.

4. The apparatus of claim 1, the time-varying failure rate distribution characterized as a predicted mean time between failure (MTBF) distribution for the data storage devices, the fault injection module determining a total number of predicted failures of the data storage devices in relation to the MTBF distribution, the duration of the first time interval and the total number of data storage devices, the fault injection module inducing the total number of predicted failures during the second time interval.

5. The apparatus of claim 1, the fault injection module further adapted to simulate failures in the server during the first time interval.

6. The apparatus of claim 1, the server performing a rebalancing operation upon the map structure responsive to each simulated hardware and software based failure in the data storage devices.

7. The apparatus of claim 1, the plurality of storage devices arranged among a plurality of storage enclosures each comprising a control board, a power supply and a cooling assembly, the fault injection module further adapted to induce simulated software and hardware based failures in the respective control boards, power supplies and cooling assemblies during the first time interval.

8. The apparatus of claim 7, the storage system further comprising a plurality of storage servers associated with the plurality of storage enclosures, the fault injection module further adapted to induce simulated hardware and software based failures in the respective storage servers.

9. The apparatus of claim 1, the fault injection module comprising a failure model block which identifies a total number of failures predicted for the data storage devices during the first interval, a simulation data module which provides simulated data objects during operation of the fault injection module, and a data logging and reporting module which accumulates performance statistics responsive to operation of the storage system to recover from each induced simulated hardware and software based failure.

10. A system comprising:
a server adapted to communicate with users over a network, the server comprising a processor and associated memory to maintain a map structure;
a plurality of storage enclosures coupled to the server, each storage enclosure housing a plurality of data storage devices which store and retrieve data objects of the users, a control board, a power supply and a cooling assembly, the map structure of the server describing the data objects stored by the data storage devices;
a plurality of storage controllers, each storage controller comprising a processor and associated memory to control an associated storage enclosure; and
a failure simulation module comprising a processor and associated programming in memory adapted to induce a total number of simulated failures of at least selected data storage devices of the plurality of storage enclosures over an accelerated time interval, the total number of simulated failures induced by altering operation of hardware and software of the at least selected data storage devices during the accelerated time interval equal to or greater than a total number of predicted failures of the data storage devices expected during a longer, service life interval of the storage enclosures, the accelerated time interval is equal to or less than 5% of the service life interval, the server modifying the map structure response to each of the total number of simulated failures.

11. The system of claim 10, wherein the total number of simulated failures is selected in relation to a predicted mean time between failure (MTBF) distribution for the data storage devices, the duration of the service life interval and the total number of data storage devices.

12. A computer-implemented method comprising:
using a storage system to store user data objects in a plurality of data storage devices in accordance with a map structure maintained by a server;
predicting a total number of actual failures of the data storage devices over a service life interval thereof responsive to a failure rate distribution associated with the data storage devices;
inducing a total number of simulated hardware and software based failures corresponding to the total number of actual failures during an accelerated testing interval shorter than the service life interval, the accelerated time interval is equal to or less than 5% of the service life interval, the server updating the map structure responsive to each of the total number of simulated hardware and software based failures.

13. The method of claim 12, wherein the total number of actual failures equal to or less than the total number of simulated hardware and software based failures.

14. The method of claim 12, wherein at least one of the total number of simulated hardware and software based failures is induced by electronically disconnecting a selected storage device from the server, instructing the selected data storage devices to erase the data objects stored thereon, and subsequently operably reconnecting the erased selected data storage devices to the server while the selected storage device remain housed within an associated storage enclosure.

15. The method of claim 12, wherein at least one of the total number of simulated hardware and software based failures is induced by physically disconnecting and removing an operable data storage device from an associated storage enclosure and replacing the physically disconnected and removed operable data storage device with a replacement data storage device.

16. The method of claim 12, wherein the time-varying failure rate distribution is characterized as a predicted mean time between failure (MTBF) distribution for the data storage devices, the predicted total number of actual failures of the data storage devices determined in relation to the MTBF distribution, the duration of the service life interval and the total number of data storage devices.

17. The method of claim 12, further comprising simulating a failure of a selected storage device having a first set of data objects, and directing a write operation to write a second set of data objects to a data structure associated with the selected storage device prior to resolution of the simulated hardware and software based failure so that, upon recovery, the selected storage device is configured to store the second set of data objects.

18. The method of claim 12, further comprising transferring simulated data objects to the storage system during the accelerated testing interval to maintain a nominally 100% utilization level of the server during said simulated hardware and software based failures.

* * * * *